(12) United States Patent
Shimo et al.

(10) Patent No.: US 6,429,971 B2
(45) Date of Patent: Aug. 6, 2002

(54) FOCUSING METHOD FOR A DECENTERED OPTICAL SYSTEM

(75) Inventors: Mituaki Shimo, Osaka; Soh Ohzawa, Toyonaka, both of (JP)

(73) Assignee: Minolta Co., Ltd., Osaka (JP)

(*) Notice: Subject to any disclaimer, the term of this patent is extended or adjusted under 35 U.S.C. 154(b) by 0 days.

(21) Appl. No.: 09/737,920

(22) Filed: Dec. 15, 2000

(30) Foreign Application Priority Data

Dec. 24, 1999 (JP) .......................................... 11-366288

(51) Int. Cl.⁷ .......................... G02B 27/64; G03B 21/14
(52) U.S. Cl. ........................ 359/557; 359/649; 353/69; 353/70
(58) Field of Search .................. 359/554–557, 359/642, 649, 630–634; 353/69–70, 90, 101

(56) References Cited

U.S. PATENT DOCUMENTS

| | | | |
|---|---|---|---|
| 4,152,050 A | * 5/1979 | Fujii | 359/554 |
| 5,032,022 A | 7/1991 | Sato et al. | 353/69 |
| 5,096,288 A | 3/1992 | Yano et al. | 353/69 |
| 5,220,363 A | 6/1993 | Sato et al. | 353/69 |
| 5,302,983 A | 4/1994 | Sato et al. | 353/69 |
| 5,422,691 A | 6/1995 | Ninomiya et al. | 353/69 |
| 5,442,413 A | 8/1995 | Tejima et al. | 353/69 |
| 5,479,224 A | 12/1995 | Yasugaki et al. | 353/101 |
| 5,587,836 A | 12/1996 | Takahashi et al. | 359/630 |
| 5,623,364 A | * 4/1997 | Morooka | 359/557 |
| 5,709,445 A | 1/1998 | Takamoto | 353/70 |
| 5,716,118 A | 2/1998 | Sato et al. | 353/98 |
| 5,820,240 A | 10/1998 | Ohzawa | 353/70 |
| 5,926,316 A | * 7/1999 | Sugawara | 359/557 |
| 5,947,576 A | * 9/1999 | Sato et al. | 353/70 |
| 6,123,425 A | 9/2000 | Ohzawa | 353/69 |
| 6,220,712 B1 | * 4/2001 | Ohzawa | 353/70 |

FOREIGN PATENT DOCUMENTS

| | | |
|---|---|---|
| JP | 05-100312 A | 4/1993 |
| JP | 05-113600 A | 5/1993 |
| JP | 05-119283 A | 5/1993 |
| JP | 05-119395 A | 5/1993 |

* cited by examiner

*Primary Examiner*—Thong Nguyen
(74) *Attorney, Agent, or Firm*—Sidley Austin Brown & Wood LLP

(57) ABSTRACT

A focusing method for a decentered optical system including a decentered lens element has translationally moving and inclining at least one lens element for different object distances, in such a way that variation in a position of a primary image point is kept within a range defined by the following condition. Here $\Delta f_b$ represents a maximum distance traveled by the primary image point during focusing; and $\Theta_{max}$ represents a maximum angle of peripheral rays traveling from a center of an object to a center of an image plane relative to a base ray:

$$|\Delta f_b \times \sin(\Theta_{max})|_{max} \leq 0.8.$$

12 Claims, 9 Drawing Sheets

FOCUSING METHOD FOR A DECENTERED OPTICAL SYSTEM

This application is based on application No. H11-366288 filed in Japan on Dec. 24, 1999, the entire contents of which are hereby incorporated by reference.

BACKGROUND OF THE INVENTION

1. Field of the Invention

The present invention relates to a decentered optical system including a decentered lens element, and particularly to a focusing method that keeps the image point substantially in a fixed position even when the object distance varies.

2. Description of the Prior Art

Conventionally, as focusing methods for centered optical systems, a plurality of methods have been proposed such as those by which a whole lens system or a front lens unit is moved out. However, such focusing methods for centered optical systems by which a lens system or lens unit is moved along the optical axis are not applicable to optical systems, such as decentered optical systems, that have no optical axis or an optical axis that can not be defined as a straight line.

Therefore, for decentered optical systems, a focusing method has been proposed by which part of a decentered optical system is designed as a centered optical system and part of the constituent lens elements of this centered optical system are moved along the optical axis thereof.

However, the above-mentioned focusing method proposed for decentered optical systems requires incorporation of a centered optical system in a decentered optical system, and therefore makes the entire optical system larger and in addition restricts the freedom of design of the decentered optical system. Furthermore, in such a centered optical system portion, the central ray needs to be aligned with the optical axis, which makes the entire optical system still larger.

SUMMARY OF THE INVENTION

An object of the present invention is to provide a focusing method for a decentered optical system that permits the decentered optical system to be designed without incorporating a centered optical system therein and without sacrificing the freedom of design thereof.

To achieve the above object, according to one aspect of the present invention, a focusing method for a decentered optical system including a decentered lens element is provided with: translationally moving and inclining at least one lens element for different object distances in such a way that variation in the position of the primary image point is kept within the range defined by the following condition:

$$|\Delta f_b \times \sin(\Theta_{max})|_{max} \leq 0.8$$

where $\Delta f_b$ represents the maximum distance traveled by the primary image point during focusing; and $\Theta_{max}$ represents the maximum angle of peripheral rays traveling from the center of an object to the center of the image plane relative to a base ray.

The primary image point is defined by the following calculation method. Relative to the ray (base ray) that travels from the center of an object through the center of an aperture stop to the image plane, the values attributable to the first surface of the optical system and then the values attributable to the second and the following surfaces are determined. Then, the back focal length of the entire system, i.e. the composite back focal length of those of the first to the last (the n-th) surfaces, and the magnification of the entire system at that time are defined. If the object is located at infinity, the focal length is used instead of the magnification.

According to another aspect of the present invention, a focusing method for a decentered optical system including a decentered lens element is provided with: translationally moving and inclining at least one lens element for different object distances in such a way that the primary image point is kept substantially in a fixed position, wherein the following condition is fulfilled:

$$|\Delta f_s / \Delta d_l| \leq 20$$

where $\Delta d_l$ represents the variation in the object distance; and $\Delta f_s$ represents the amount of movement, during focusing, of at least one point within the effective area on the surface of the lens element that is moved for focusing.

According to another aspect of the present invention, a decentered optical system is provided with: a decentered lens element, wherein at least one lens element is translationally moved and inclined for different object distances in such a way that variation in a position of a primary image point is kept within a range defined by the following condition:

$$|\Delta f_b \times \sin(\Theta_{max})|_{max} \leq 0.8$$

where $\Delta f_b$ represents a maximum distance traveled by the primary image point during focusing; and $\Theta_{max}$ represents a maximum angle of peripheral rays traveling from a center of an object to a center of an image plane relative to a base ray.

According to another aspect of the present invention, a decentered optical system is provided with: a decentered lens element, wherein at least one lens element is translationally moved and inclined for different object distances in such a way that a primary image point is kept substantially in a fixed position, wherein the following condition is fulfilled:

$$|\Delta f_s / \Delta d_l| \leq 20$$

where $\Delta d_l$ represents a variation in the object distance; and $\Delta f_s$ represents an amount of movement, during focusing, of at least one point within an effective area on a surface of the lens element that is moved for focusing.

BRIEF DESCRIPTION OF THE DRAWINGS

This and other objects and features of this invention will become clear from the following description, taken in conjunction with the preferred embodiments with reference to the accompanied drawings in which.

DESCRIPTION OF THE PREFERRED EMBODIMENTS

Figure 1:
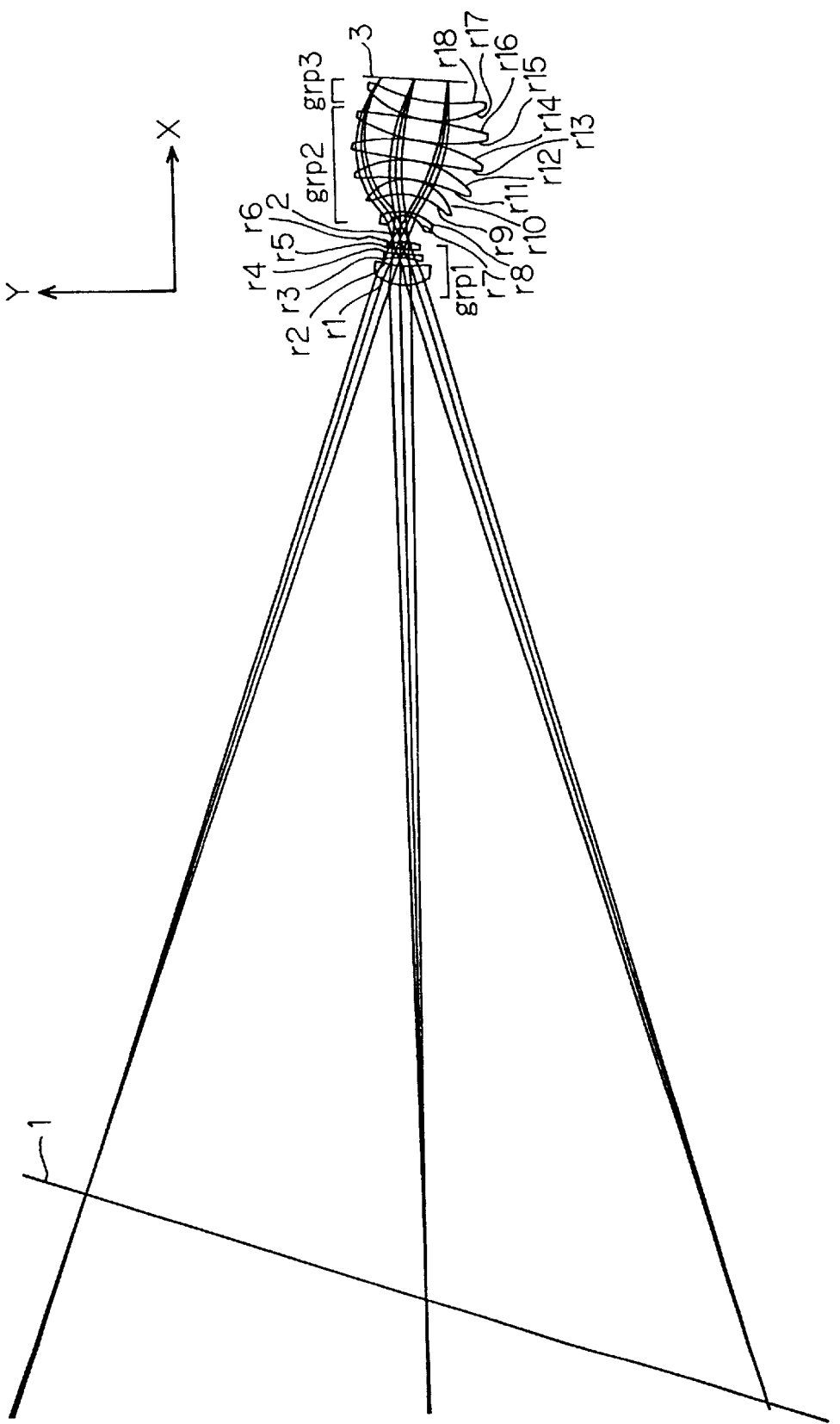
FIG. 1 is a diagram illustrating the construction of a decentered optical system embodying the present invention (at pos 1)
Figure 2:
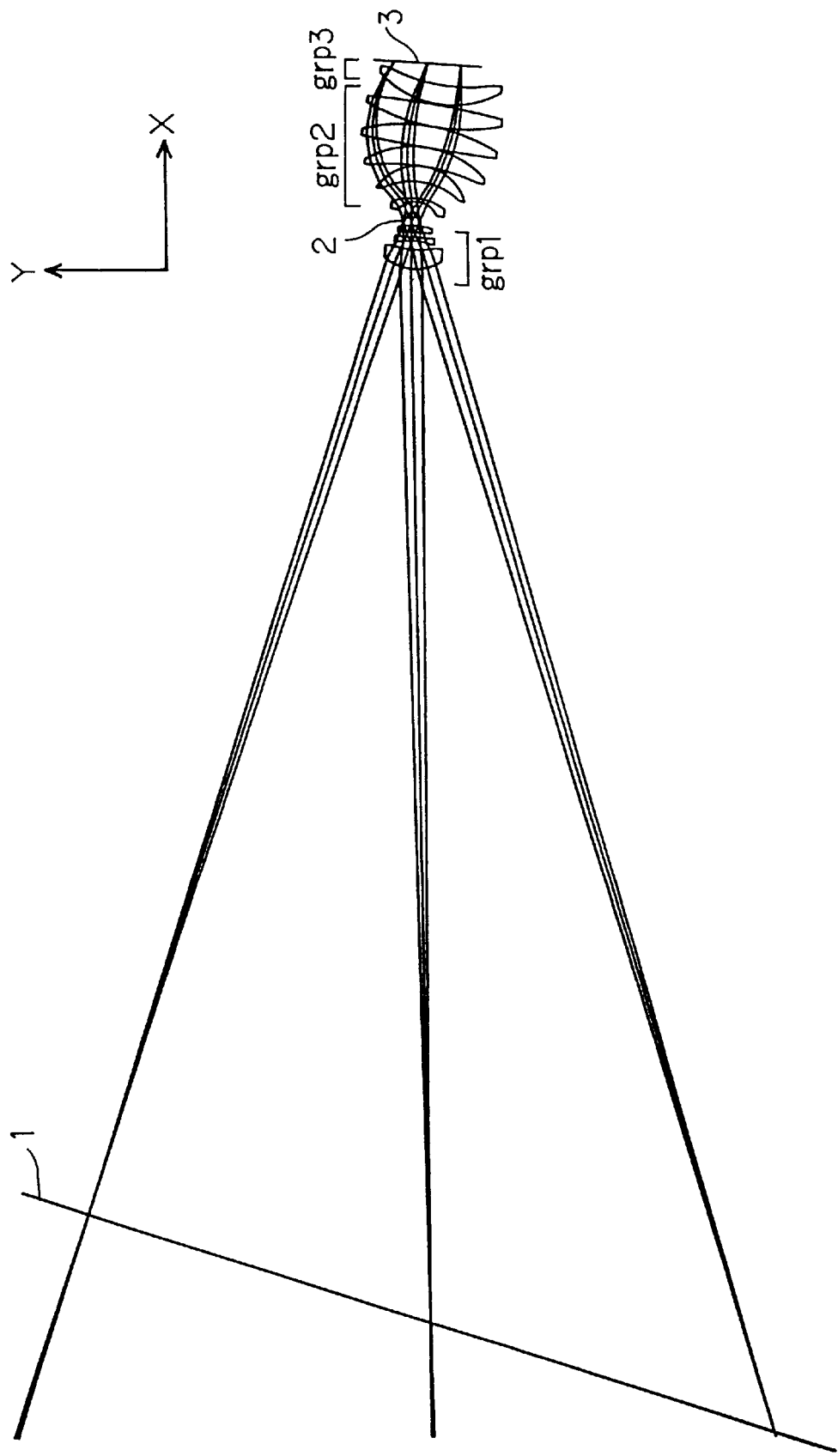
FIG. 2 is a diagram illustrating the construction of the decentered optical system embodying the present invention (at pos 2)
Figure 3:
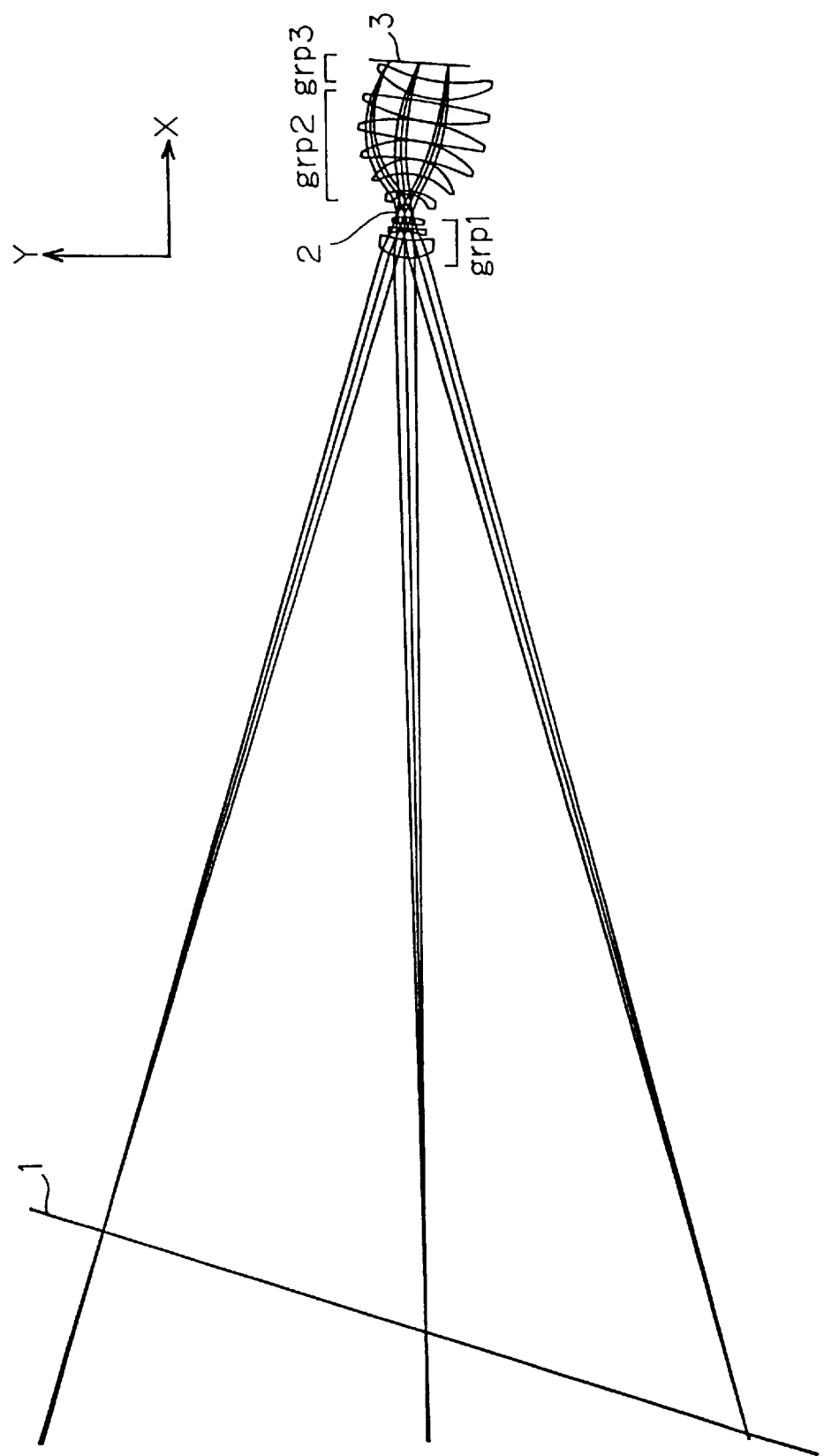
FIG. 3 is a diagram illustrating the construction of the decentered optical system embodying the present invention (at pos 3)
Figure 4:
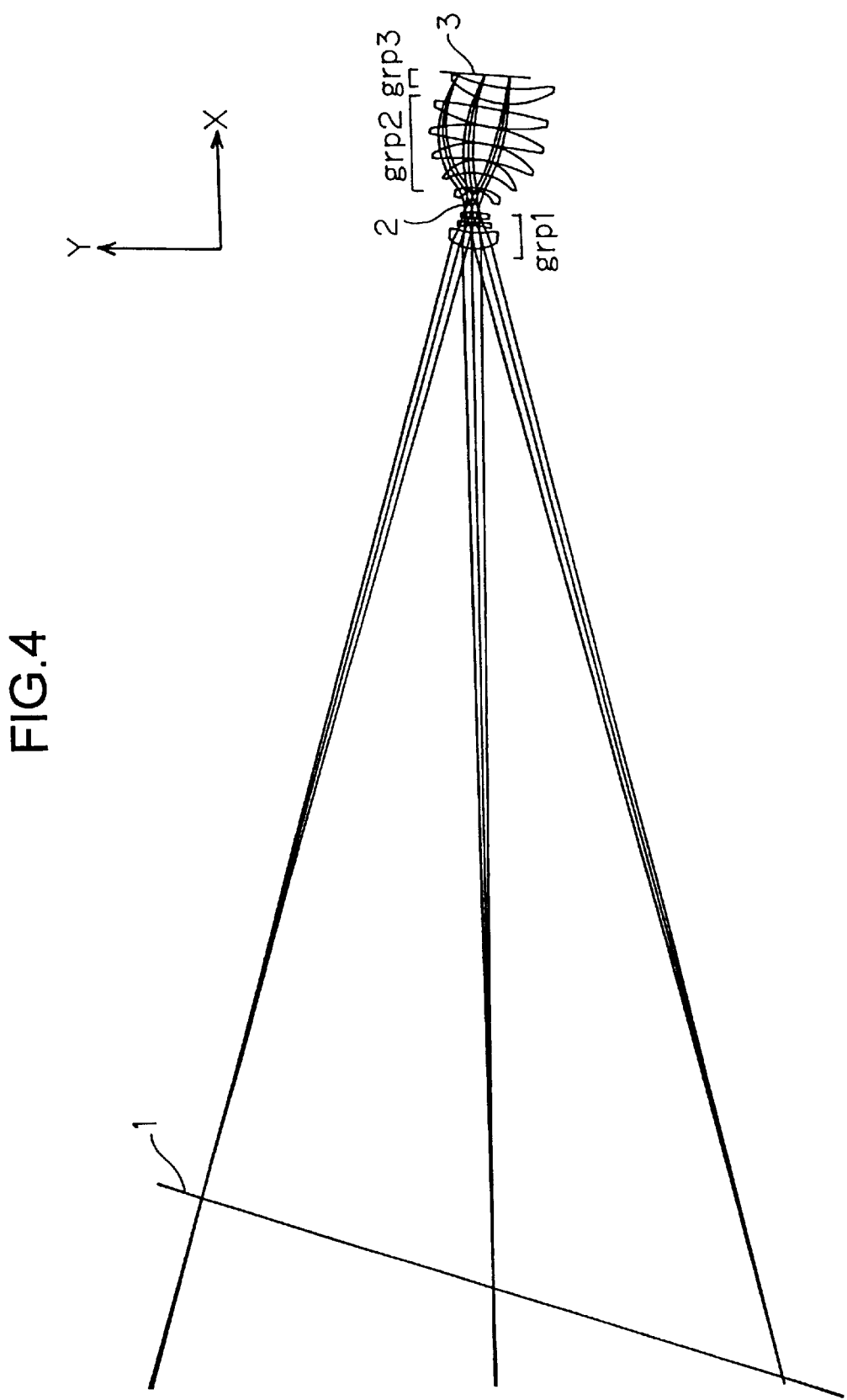
FIG. 4 is a diagram illustrating the construction of the decentered optical system embodying the present invention (at pos 4)
Figure 5:
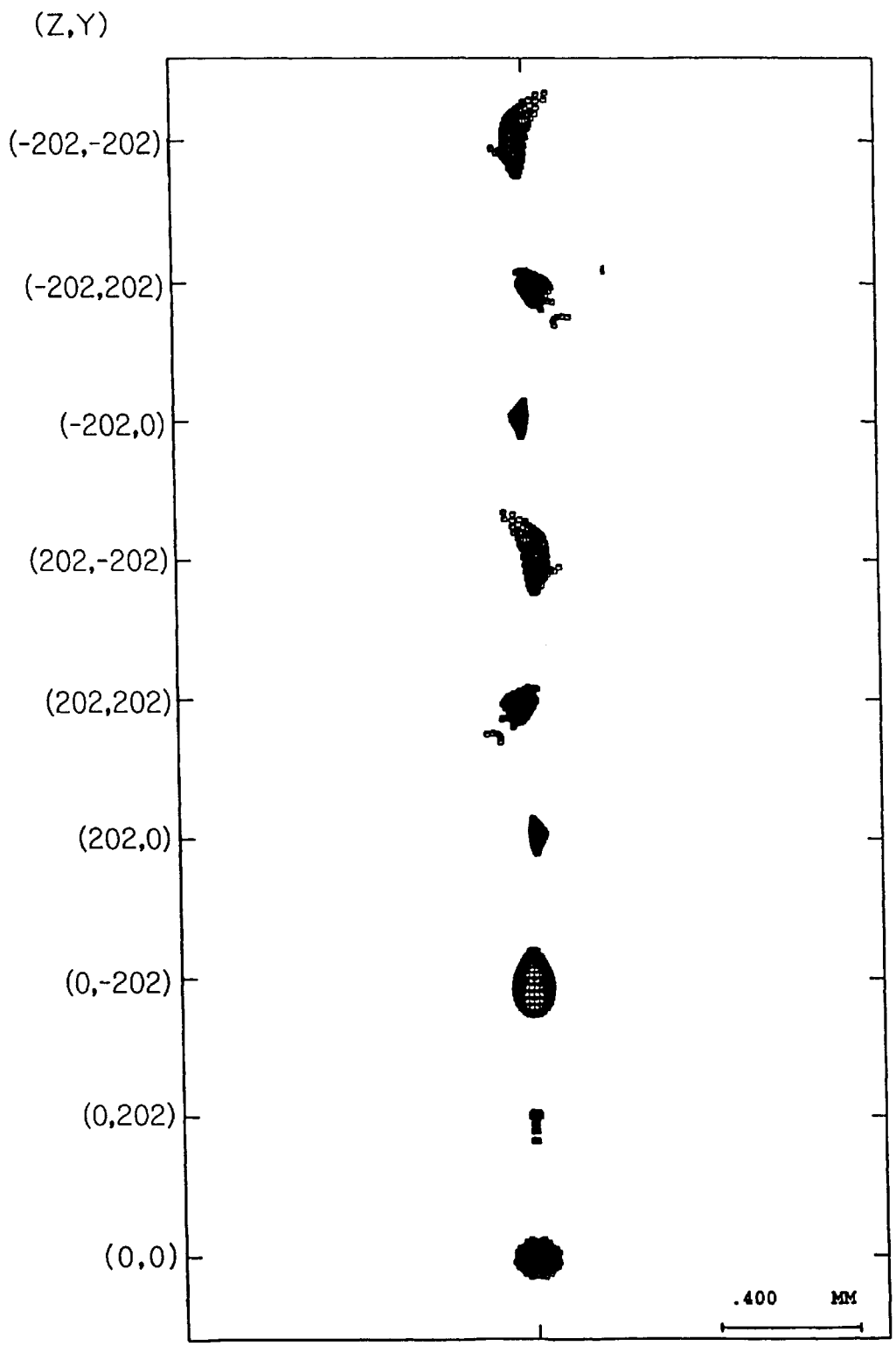
FIG. 5 is a spot diagram of the decentered optical system embodying the present invention (at pos 1)
Figure 6:
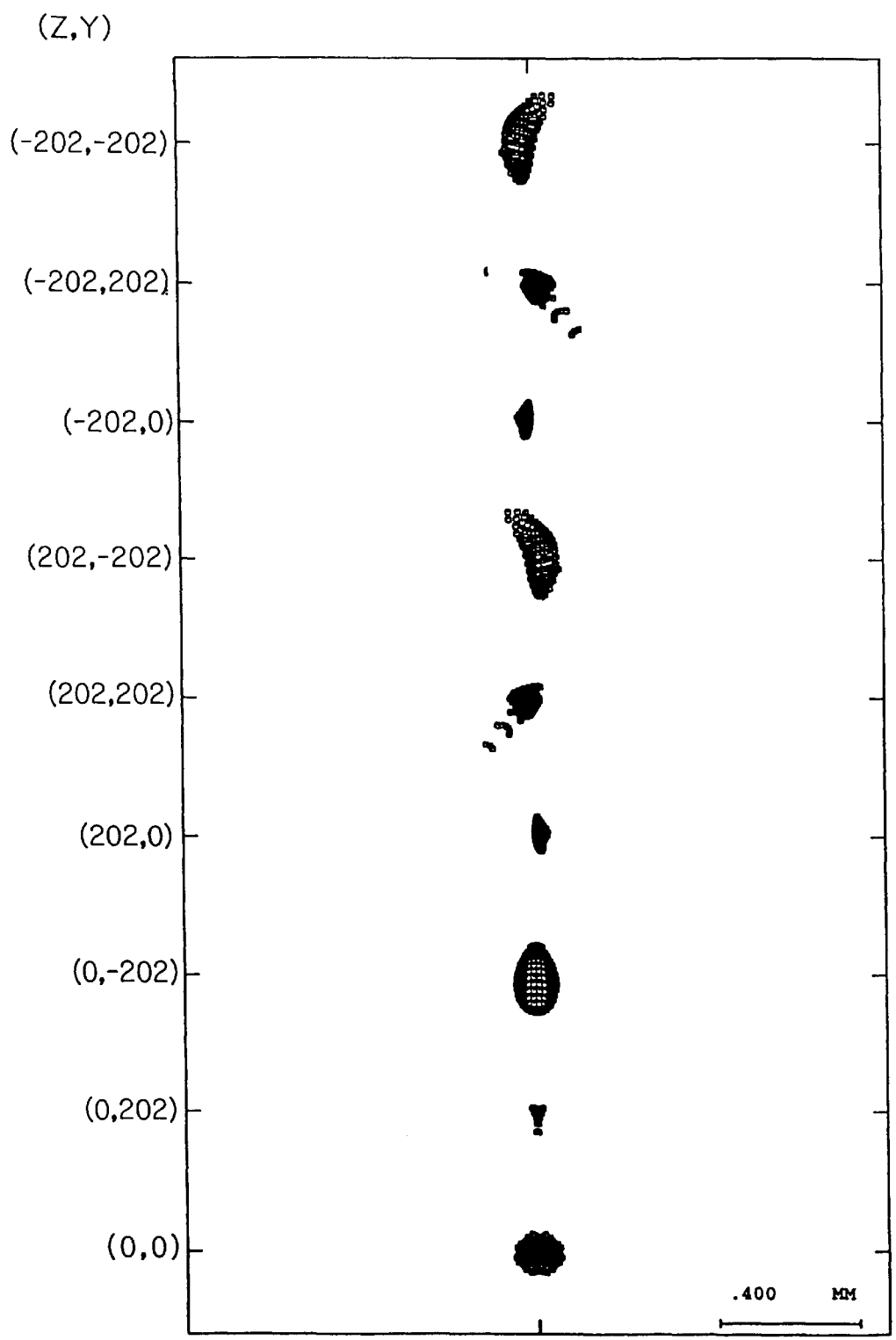
FIG. 6 is a spot diagram of the decentered optical system embodying the present invention (at pos 2)
Figure 7:
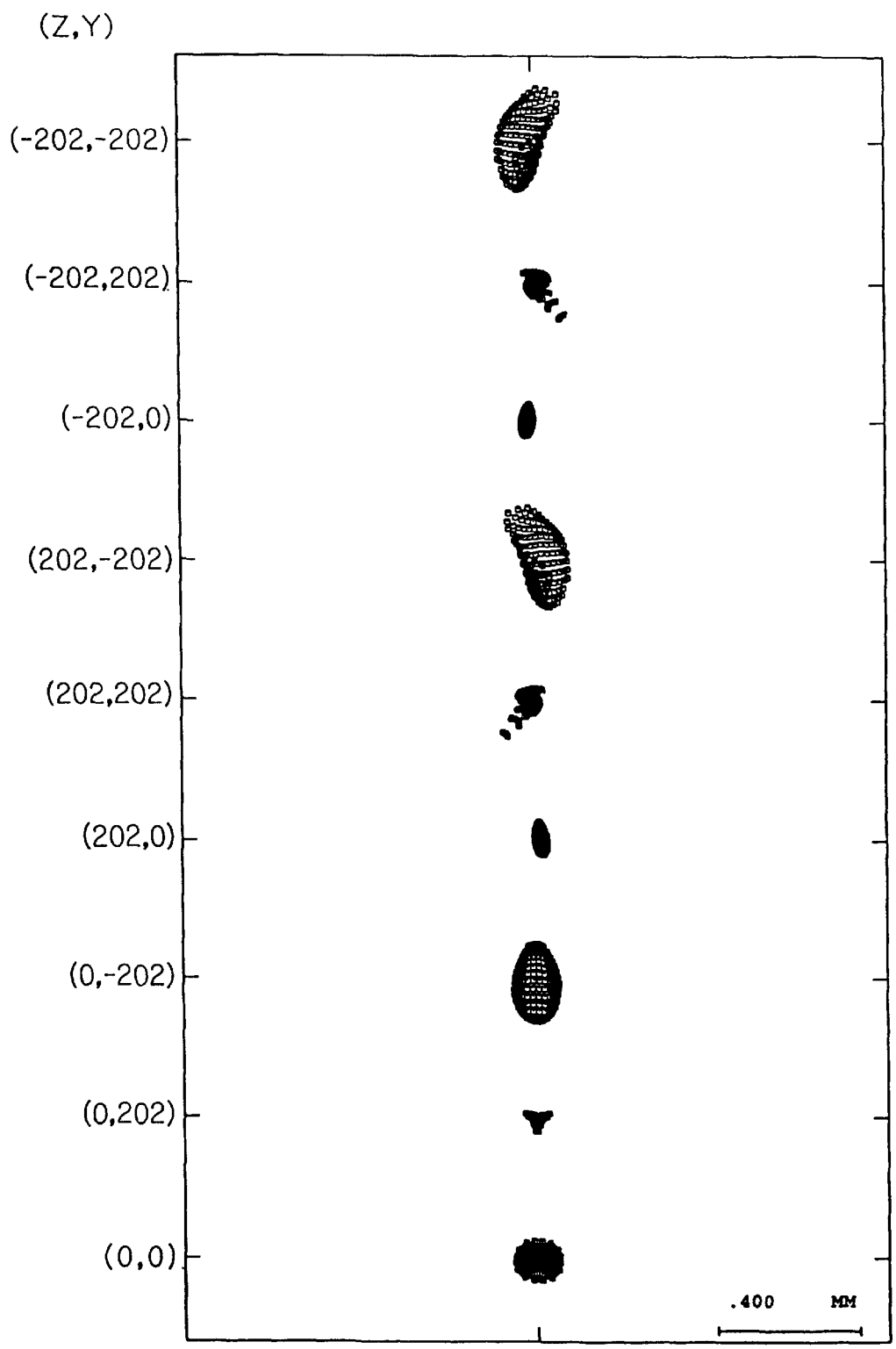
FIG. 7 is a spot diagram of the decentered optical system embodying the present invention (at pos 3)
Figure 8:
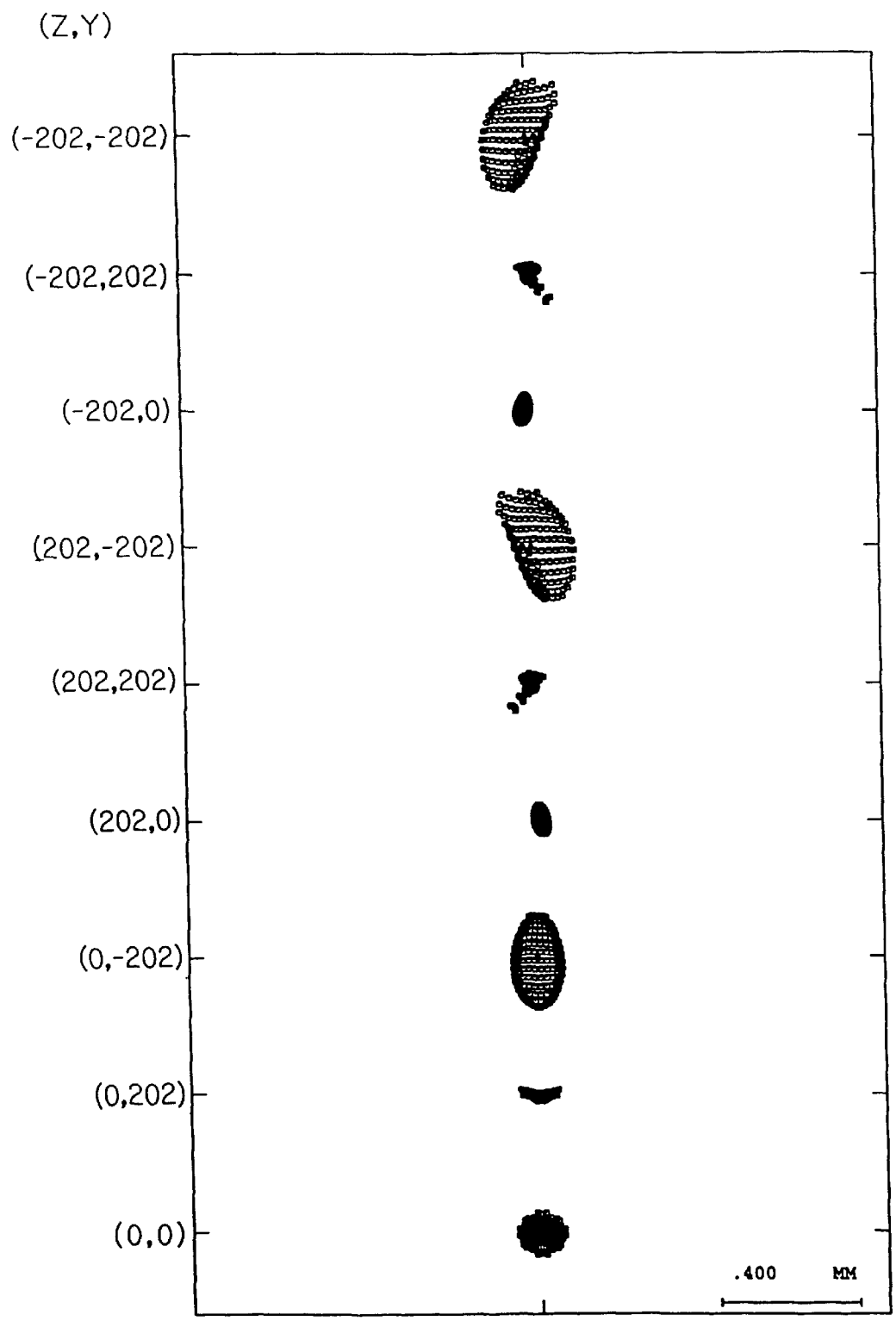
FIG. 8 is a spot diagram of the decentered optical system embodying the present invention (at pos 4)

Hereinafter, an embodiment of the present invention will be described with reference to the drawings. In a centered optical system, focusing is achieved by moving all or a part of the constituent lens elements translationally along the optical axis. On the other hand, in a decentered optical system, translational movement alone does not achieve proper focusing because it brings the formed image out of focus and shifts the image-formation area away from where it should be. Therefore, as a method for calculating first-order parameters of a decentered optical system, the one discussed in the following treatises is used:

Bryan D. Stone and G. W. Forbes, *Characterization of first-order optical properties for asymmetric systems*, J. Opt. Soc. Am, A9, 478–489 (1992)

Bryan D. Stone and G. W. Forbes, *Foundations of first-order layout for asymmetric systems: an application of Hamilton's methods*, J. Opt. Soc. Am, A9, 832–843 (1992).

In a decentered optical system, it is preferable to minimize variation in the position of the primary image point between different focusing positions by moving a focusing portion appropriately. To achieve this, a focusing lens element or block needs to be moved translationally and simultaneously inclined so as to be decentered. In a centered optical system, where the principal ray of central rays travels along the optical axis, only translational movement is needed; however, in a decentered optical system, simply moving a lens element translationally causes the path of the principal ray of central rays to move, and thus causes the center of the formed image to shift. Therefore, a lens element or block needs to be not only moved translationally but also inclined so as to be decentered. In this way, even in a decentered optical system, it is possible to keep the primary image point substantially in a fixed position, and thereby prevent shifting of the image point and of the image-formation area.

In a decentered optical system, the primary image point shifts most in two mutually perpendicular directions, and therefor needs to be adjusted in each of those two directions. However, since the primary image point can seldom be adjusted perfectly, it suffices to bring it in the vicinity of its ideal position. In addition, it is also necessary to take into consideration the shift of the best-focus position due to proximity-induced variation of aberrations. Anyway, an excessive shift of the primary image point is undesirable.

In this embodiment, in a decentered optical system including a decentered lens element, at least one lens element is moved translationally and inclined for different object distances in such a way that variation in the position of the primary image point is kept within a range defined by condition (1) below.

$$|\Delta f_b \times \sin(\Theta_{max})|_{max} \leq 0.8 \qquad (1)$$

where $\Delta f_b$ represents the maximum distance traveled by the primary image point during focusing; and $\Theta_{max}$ represents the maximum angle of peripheral rays traveling from the center of an object to the center of the image plane relative to the base ray.

Condition (1) defines the maximum variation in the position of the primary image point during focusing. Disregarding the range defined by condition (1) leads to poor focusing, lower optical performance, and shifting of the image-formation area.

The primary image point is defined by the following calculation method. Relative to the ray (base ray) that travels from the center of an object through the center of an aperture stop to the image plane, the values attributable to the first surface of the optical system is determined by procedure (a) described below and the values attributable to the second and the following surfaces are determined by procedure (b) described below. Then the back focal length of the entire system, i.e. the composite back focal length of those of the first to the last (the n-th) surfaces, and the magnification of the entire system at that time are defined by procedure (c) described below. If the object is located at infinity, the focal length is used instead of the magnification.

First, the coordinate system of the i-th surface is determined in the following manner. The direction normal to the i-th surface is used as the $\zeta_i$-axis, and the direction perpendicular to the surface (i.e. incident surface) formed between the base ray incident on the i-th surface and the normal to the i-th surface is used as the $\xi_i$-axis, of which the positive direction is defined as the direction in which $Q_i \times E_i$ is positive. The positive direction of the $\zeta_i$-axis is defined as the direction in which $Q_i \times E_i$ is positive.

Here $Q_i$ represents the vector of the direction of the base ray incident on the i-th surface; and $E_i$ represents the vector of the direction of the normal to the i-th surface.

The $\eta_i$-axis is defined so as to form a right-hand system together with the $\zeta_i$ and $\xi_i$-axes.

Figure 9:
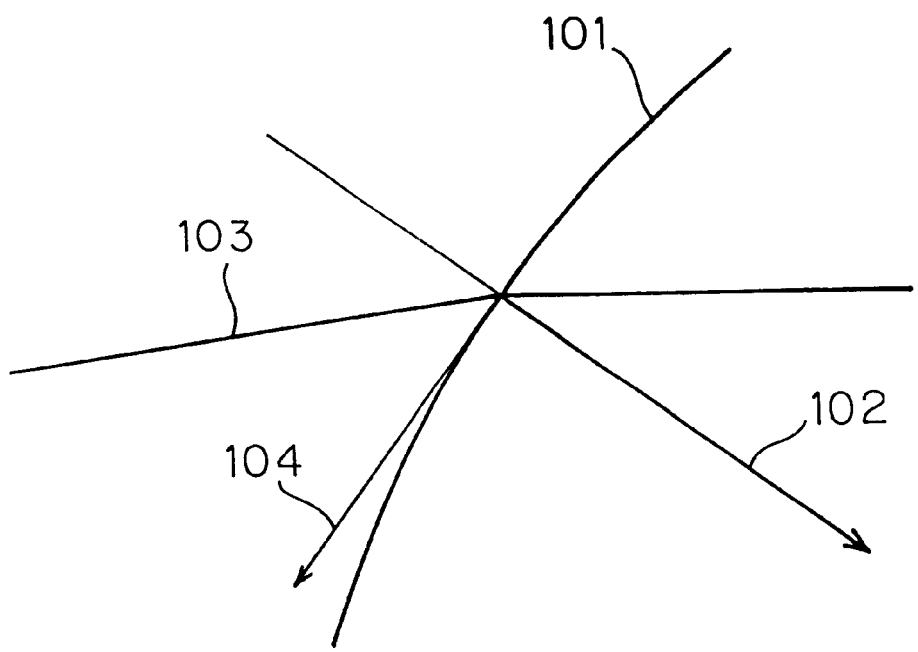
FIG. 9 is a sectional view schematically showing the relationship between the i-th surface, the coordinate system axis, and the base ray.

FIG. 9 is a sectional view schematically showing the relationship between the i-th surface, the coordinate system axes, and the base ray. In this figure, the direction of the normal 102 to the i-th surface 101 is the $\zeta_i$- axis, and the surface (i.e. incident surface) formed between the base ray 103 incident on the i-th surface 101 and the normal 102 to the i-th surface 101 is the plane of the drawing. The $\xi_i$-axis points forward (toward the reader) perpendicularly to the plane of the drawing. The direction of the tangent 104 to the i-th surface as seen on the plane of the drawing is the $\eta_i$-axis.

<Procedure (a)>

In a finite, conjugate optical system, the values attributable to the first surface is given by (in the $\xi_i$-axis direction)

$$F_1^\xi = \frac{D_1^\xi}{s_1 D_1^\xi + S_1^\xi}$$

$$M_1^\xi = -\frac{S_1^\xi}{S_1^\xi + s_1 D_1^\xi}$$

$$B_1^\xi = -\frac{s_1 S_1^\xi}{S_1^\xi + s_1 D_1^\xi}$$

(in the $\eta_i$-axis direction)

$$F_1^\eta = \frac{D_1^\eta}{s_1 D_1^\eta + S_1^\eta \cos^2(\theta_{GIF}^\eta)}$$

-continued $$M_1^\eta = -\frac{S_1^\eta \cos(\theta_{GIF}^\eta)\cos(\theta_{GIF}^{\eta\prime})}{S_1^\eta \cos^2(\theta_{GIF}^\eta) + s_1 D_1^\eta}$$

$$B_1^\eta = -\frac{s_1 S_1^\eta \cos^2(\theta_{GIF}^\prime)}{S_1^\eta \cos^2(\theta_{GIF}^\eta) + s_1 D_1^\eta}$$

where $$D_1 = \{n_1 \cos(\theta_1) - n_1' \cos(\theta_1')\}$$

$$S_1^\xi = \frac{\partial^2 g_1}{\partial \xi^2}$$

$$S_1^\eta = \frac{\partial^2 g_1}{\partial \eta^2}$$

where

GIF represents the front surface of the first lens (disposed at the object side end);

$s_l$ represents the actual distance along the base ray from the center of the object to the incident point on the first surface;

$n_l$ represents the refractive index of the medium immediately in front of the first surface;

$n_l'$ represents the refractive index of the medium immediately behind the first surface;

$\theta_l$ represents the incident angle of the base ray incident on the first surface;

$\theta_l'$ represents the exiting angle of the base ray exiting from the first surface;

$g_l$ represents the surface shape of the first surface, expressed as $g_l = g_l(\xi, \eta)$; and $S_l^\xi$, $S_1^{\eta}$ represent second-order differentials of $g_i$ in the $\xi$ and $\eta$ directions, respectively, at the incident point of the base ray incident on the first surface, and thus represent the local curvatures in those directions.

In an infinite optical system, the values attributable to the first surface are determined by procedure (b) described below.

<Procedure (b)>

The values attributable to the surfaces (the i-th surface) other than the first surface are calculated in the following manner. In an infinite optical system, the values attributable to the first surface are also calculated in the following manner (here, i=1).

(in the $\xi_i$ direction)

$$F_i^\xi = -\frac{d_i}{n_i} - \frac{1}{D_i S_i^\xi}$$

$$M_i^\xi = -\frac{1}{D_i S_i^\xi}$$

$$B_i^\xi = -\frac{1}{D_i S_i^\xi}$$

(in the $\eta_i$ direction)

$$F_i^\eta = -\frac{d_i}{n_i} - \frac{1}{D_i S_i^\xi} \cos^2(\theta_i)$$

$$M_i^\eta = -\frac{1}{D_i S_i^\xi} \cos(\theta_i) \cos(\theta_i')$$

-continued $$B_i^\xi = -\frac{1}{D_i S_i^\xi} \cos^2(\theta_i')$$

where $$D_i = \{n_i \cos(\theta_i) - n_i' \cos(\theta_i')\}$$

$$S_i^\xi = \frac{\partial^2 g_i}{\partial \xi^2}$$

$$S_i^\eta = \frac{\partial^2 g_i}{\partial \eta^2}$$

where $d_i$ represents the actual distance along the base ray from the exiting point on the surface (the i–1-th surface) preceding the i-th surface to the incident point on the i-th surface;

$n_i$ represents the refractive index of the medium immediately in front of the i-th surface;

$n_i'$ represents the refractive index of the medium immediately behind the i-th surface;

$\theta_i$ represents the incident angle of the base ray incident on the i-th surface;

$\theta_i'$ represents the exiting angle of the base ray exiting from the i-th surface;

$g_i$ represents the surface shape of the i-th surface, expressed as $g_i = g_i(\xi, \eta)$; and $S_i^\xi$, $S_i^\eta$ represent second-order differentials of $g_i$ in the $\xi$ and $\eta$ directions, respectively, at the incident point of the base ray incident on the i-th surface, and thus represent the local curvatures in those directions.

<Procedure (c)>

Integration of the first surface (1) and the second surface (2) is achieved as follows:

$$M_{(1)+(2)} = -M_{(1)}(B_{(1)}+F_{(2)})^{-1} M_{(2)}$$

$$B_{(1)+(2)} = B_{(2)} - M_{(2)}(B_{(1)}+F_{(2)})^{-1} M_{(2)}$$

Integration of the result of integration up to the second surface ((1)~(2)) and the third surface (3) is achieved as follows:

$$M_{(1-2)+(3)} = -M_{(1-2)}(B_{(1-2)}+F_{(3)})^{-1} M_{(3)}$$

$$B_{(1-2)+(3)} = B_{(3)} - M_{(3)}(B_{(1-2)}+F_{(3)})^{-1} M_{(3)}$$

Integration of the result of integration up to a certain surface (the k-th surface) and the next surface (the k+1-th surface) is achieved as follows:

$$M_{(k)+(k+1)} = -M_{(k)}(B_{(k)}+F_{(k+1)})^{-1} M_{(k+1)}$$

$$B_{(k)+(k+1)} = B_{(k+1)} - M_{(k+1)}(B_{(k)}+F_{(k+1)})^{-1} M_{(k+1)}$$

Similar calculation are performed up to the last surface (the n-th surface) in order to integrate together all the surfaces of the entire system. As a result, the back focal length $f_{b\ all}$ of the entire system is given as (in the $\xi$ direction)

$$f_b^\xi{}_{all} = B^\xi{}_{(1)-(n)}$$

(in the $\eta$ direction)

$$f_b^\eta{}_{all} = B^\eta{}_{(1)-(n)}$$

The values thus obtained are values as measured from the last lens surface to the primary image point along the base ray. On the basis of these values, the position of the primary image point is calculated. On the other hand, the magnification of the entire system $\beta_{all}$ is given as
(in the $\xi$ direction)

$$\beta^\xi{}_{all} = -M^\xi{}_{(1)-(n)}$$

(in the $\eta$ direction)

$$\beta^\eta{}_{all} = -M^\eta{}_{(1)-(n)}$$

In an infinite optical system, the focal length is used instead of the magnification. In an optical system symmetric only with respect to the Y-Z surface, the focal length is given as
(in the X direction)

$$f^X{}_{(k)-(n)} = f^\xi{}_{(k)-(n)}$$

(in the Y direction)

$$f^Y{}_{(k)-(n)} = f^\eta{}_{(k)-(n)}$$

In the following cases, integration is achieved according to the formulae noted below instead of those previously noted.

$S_k{}^\xi = 0$ (when the local curvature in the $\xi$ direction is 0, i.e. when the local radius of curvature is infinite)

$$M^\xi{}_{(k)+(k+1)} = M^\xi{}_{(k+1)}$$

$$B^\xi{}_{(k)+(k+1)} = B^\xi{}_{(k+1)}$$

$S_k{}^\eta = 0$ (when the local curvature in the $\eta$ direction is 0, i.e. when the local radius of curvature is infinite)

$$M^\eta_{(k)+(k+1)} = M^\eta_{(k+1)} \frac{\cos(\theta_k)}{\cos(\theta'_k)}$$

$$B^\eta_{(k)+(k+1)} = B^\eta_{(k+1)}$$

$S_{k+1}{}^\xi = 0$ (when the local curvature in the $\xi$ direction is 0, i.e. when the local radius of curvature is infinite)

$$M^\xi_{(k)+(k+1)} = M^\xi_{(k)}$$

$$B^\xi_{(k)+(k+1)} = \frac{B^\xi_{(k+1)} - d_{k+1}}{n_{k+1}}$$

$S_{k+1}{}^\eta = 0$ (when the local curvature in the $\eta$ direction is 0, i.e. when the local radius of curvature is infinite)

$$M^\eta_{(k)+(k+1)} = M^\eta_{(k)} \frac{\cos(\theta'_{(k+1)})}{\cos(\theta_{(k+1)})}$$

$$B^\eta_{(k)+(k+1)} = \frac{(B^\eta_{(k)} n_{(k+1)} - d_{(k+1)}) \cos^2(\theta'_{(k+1)})}{n_{(k+1)} \cos^2(\theta_{(k+1)})}$$

In this way, the primary image point is calculated. The formulae noted hereinbefore are for plane-symmetric optical systems; however, it is to be understood that the present invention is not limited to such optical systems but can easily be adopted to optical systems having no plane symmetry.

In this embodiment, in a decentered optical system including a decentered lens element, at least one lens element is translationally moved and inclined for different object distances in such a way that the primary image point is kept substantially in a fixed position, and in addition condition (2) below is fulfilled.

$$|\Delta f_s / \Delta d_l| \leq 20 \quad (2)$$

where $\Delta d_l$ represents the variation in the object distance; and $\Delta f_s$ represents the amount of movement, during focusing, of at least one point within the effective area on the surface of the lens element that is moved and inclined for focusing.

Condition (2) defines the maximum distance traveled by the lens element that is moved and inclined according to the object distance in order to achieve focusing. Disregarding the range defined by this condition makes the movement distance unduly long and this leads to considerable degradation in optical performance. Moreover, it becomes necessary to secure enough space for the movement of the lens element at the sacrifice of compactness.

Furthermore, by the focusing method of this embodiment, focusing is achieved in such a way as to fulfill condition (3) below.

$$0.7 \leq |\Delta(\beta^\xi/\beta^\eta)|_{max} \leq 1.5 \quad (3)$$

where $\beta^\xi$ represents the magnification in the $\xi$ direction;

$\beta^\eta$ represents the magnification in the $\eta$ direction; and $$\Delta\left(\frac{\beta^\xi}{\beta^\eta}\right)$$

represents a maximum variation in a ratio of the magnification in the $\xi$ direction to the magnification in the $\eta$ direction during focusing, i.e.

$$\left(\frac{\beta^\xi}{\beta^\eta}\right)_{pos(a)} \bigg/ \left(\frac{\beta^\xi}{\beta^\eta}\right)_{pos(b)},$$

where $$\left(\frac{\beta^\xi}{\beta^\eta}\right)_{pos(a)}$$

represents the ratio of the magnification in the $\xi$ direction to the magnification in the $\eta$ direction at one focusing position pos(a) and $$\left(\frac{\beta^\xi}{\beta^\eta}\right)_{pos(b)}$$

represents the ratio of the magnification in the $\xi$ direction to the magnification in the $\eta$ direction at another focusing position pos(b).

Condition (3) relates to the anamorphic ratio. A larger variation in the ratio of the magnification in one direction to the magnification in another direction perpendicular thereto causes distortion in the formed image. Disregarding the range defined by this condition causes variation of the aspect ratio of the formed image during focusing and thus distortion of therein.

The lens element that is moved during focusing in the focusing method of this embodiment is disposed at the image plane side end (at the rear end). This helps make the diameter of the lens element smaller.

FIGS. 1 to 4 are diagrams illustrating the construction of a decentered optical system embodying the present invention, showing its state at different focusing positions (pos) 1 to 4, respectively. In each diagram, the left-hand side is the object side and the right-hand side is the image plane side. In each diagram, the Y-axis points upward, the X-axis points to the right, and the Z-axis points forward (to the reader) perpendicularly to the plane of the figure, each figure thus presenting a sectional view taken on the X-Y plane.

In each figure, a screen 1 that serves as an object plane is disposed at the left, and, from the object plane side, a first block grp1, an aperture stop 2, a second block grp2, a third block grp3, and an image display device 3 serving as an image plane are arranged. The individual blocks each form a centered system. Here, the third block grp3 is moved and inclined for focusing.

Hereinafter, a decentered optical system according to the present invention will be described in more detail with reference to the construction data and the spot diagrams thereof. Table 1 lists the construction data of an example of such an optical system, Table 2 lists data of the position of the primary image point and the magnification, and Tables 3 and 4 list the actual values of conditions (1) to (3) and related data as observed in the example. In the construction data, ri (i=1, 2, 3, . . . ) represents the i-th surface as counted from the object plane, and, for each surface ri, the radius of curvature, the axial-distance, the refractive index for the d line, and the Abbe number are listed. For each block, the symbols X, Y, Z, and ANG represent, respectively, the X-, Y-, and Z-coordinates of the vertex of the first surface and the rotation angle of the centered optical system. Here, a counter-clockwise rotation about the Z-axis with respect to the vertex as seen from a person facing the positive Z-axis direction is regarded as a positive rotation.

Also listed are the X-, Y-, and Z-coordinates of the position and the rotation angle of other relevant elements. OBJ1 to OBJ4 indicate the coordinates of the position and the rotation angle of the object plane (screen 1) as observed at pos1 to pos4 mentioned earlier. FOC1 to FOC4 indicate the coordinates of the position and the rotation angle of the third block grp3 as observed at pos 1 to pos 4 mentioned earlier. To all of the rotation angles listed, the definition of a positive or negative rotation described above applies. All lengths are given in mm and all angles are given in degrees. In Table 4, the amount of movement resulting from focusing is given as the amount of movement of the vertex.

FIGS. 5 to 8 are spot diagrams of the decentered optical system of the example, as observed at the focusing positions pos 1 to pos 4, respectively. For each point image, its evaluation position given as (Z, Y) coordinates measured on the object plane (screen 1) are indicated on the left, and the point image is the one observed at the corresponding position on the image plane (image display device 3). These figures show that largely satisfactory point-image performance is achieved in this embodiment.

TABLE 1

Example
<Object Plane (Screen 1)>

| | | | | |
|---|---|---|---|---|
| OBJ1 | X = −580.000 | Y = 0.000 | Z = 0.000 | ANG = 18.000 |
| OBJ2 | X = −600.000 | Y = −0.022 | Z = 0.000 | ANG = 18.000 |

TABLE 1-continued

| | | | | |
|---|---|---|---|---|
| OBJ3 | X = −650.000 | Y = −0.076 | Z = 0.000 | ANG = 18.000 |
| OBJ4 | X = −700.000 | Y = −0.131 | Z = 0.000 | ANG = 18.000 |

<grp 1>

X = 0.000    Y = 0.000    Z = 0.000    ANG = 4.982

| Surface | Radius of Curvature | Axial Distance | d-line Refractive Index | Abbe Number |
|---|---|---|---|---|
| r1 | 26.17400 | | | |
| | | 11.000 | 1.77250 | 49.77 |
| r2 | 46.95900 | | | |
| | | 5.000 | 1.00000 | |
| r3 | −39.24800 | | | |
| | | 2.000 | 1.59270 | 35.45 |
| r4 | 200.59000 | | | |
| | | 3.000 | 1.00000 | |
| r5 | 235.08800 | | | |
| | | 4.000 | 1.77250 | 49.77 |
| r6 | −38.56300 | | | |
| | | 0.000 | 1.00000 | |

<Aperture 2>

X = 27.000    Y = 0.000    Z = 0.000    ANG = 0.000
Aperture Radius 4.365

| Surface | Radius of Curvature | Axial Distance | d-line Refractive Index | Abbe Number |
|---|---|---|---|---|
| ∞ | | | 1.00000 | |

<grp 2>

X = 39.000    Y = −4.424    Z = 0.000    ANG = 10.510

| Surface | Radius of Curvature | Axial Distance | d-line Refractive Index | Abbe Number |
|---|---|---|---|---|
| r7 | −12.38500 | | | |
| | | 2.000 | 1.77250 | 19.77 |
| r8 | −29.68700 | | | |
| | | 10.000 | 1.00000 | |
| r9 | −36.04100 | | | |
| | | 9.000 | 1.69680 | 56.47 |
| r10 | −27.06600 | | | |
| | | 0.100 | 1.00000 | |
| r11 | −111.28900 | | | |
| | | 11.000 | 1.69680 | 56.47 |
| r12 | −52.14900 | | | |
| | | 0.100 | 1.00000 | |
| r13 | 1479.37000 | | | |
| | | 12.000 | 1.69680 | 56.47 |
| r14 | −96.10900 | | | |
| | | 0.100 | 1.00000 | |
| r15 | 112.09300 | | | |
| | | 12.000 | 1.69680 | 56.47 |
| r16 | −505.67600 | | | |
| | | 0.100 | 1.00000 | |

<grp 3>

| | | | | |
|---|---|---|---|---|
| FOC1 | X = 94.454 | Y = −14.712 | Z = 0.000 | ANG = 10.510 |
| FOC2 | X = 95.007 | Y = −15.436 | Z = 0.000 | ANG = 10.146 |
| FOC3 | X = 96.355 | Y = −17.511 | Z = 0.000 | ANG = 9.052 |
| FOC4 | X = 97.732 | Y = −20.327 | Z = 0.000 | ANG = 7.468 |

| Surface | Radius of Curvature | Axial Distance | d-line Refractive Index | Abbe Number |
|---|---|---|---|---|
| r17 | 54.15400 | | | |
| | | 11.000000 | 1.69680 | 56.47 |
| r18 | 96.65700 | | | |
| | | 0.00000 | 1.00000 | |

<Image Plane (Image Display Device 3)>

X = 117.826    Y = −10.577    Z = 0.000    ANG = −4.103

TABLE 2

| η (Y) Direction | ξ (X) Direction | Magnification |
|---|---|---|
| [pos 1] s1 = 580.063 | | |
| X = 0.000 Y = −10.578 Z = 117.826 | X = 0.000 Y = −10.639 Z = 117.993 | βx = −0.0945 βy = −0.0943 |
| [pos 2] s1 = 600.063 | | |
| X = 0.000 Y = −10.577 Z = 117.826 | X = 0.000 Y = −10.639 Z = 117.993 | βx = −0.0921 βy = −0.0919 |
| [pos 3] s1 = 650.063 | | |
| X = 0.000 Y = −10.576 Z = 117.826 | X = 0.000 Y = −10.640 Z = 117.993 | βx = −0.0867 βy = −0.0866 |
| [pos 4] s1 = 700.063 | | |
| X = 0.000 Y = −10.575 Z = 117.827 | X = 0.000 Y = −10.642 Z = 117.992 | βx = −0.0822 βy = −0.0820 |

TABLE 3

| $(\Delta f_b)_{max}$ | $|\Delta f_b \times \sin(\Theta_{max})|_{max}$ | $\Delta(\beta x/\beta y)_{max}$ |
|---|---|---|
| 0.003 | 0.0003 | 1.000 |

TABLE 4

| | $\Delta d_1$ | $\Delta f_s$ | $\Delta f_s/\Delta d_1$ |
|---|---|---|---|
| pos 1-pos 2 | 20.000 | 0.911 | 0.05 |
| pos 2-pos 3 | 50.000 | 2.475 | 0.05 |
| pos 3-pos 4 | 50.000 | 3.134 | 0.06 |

What is claimed is:

1. A focusing method for a decentered optical system including a decentered lens element, comprising:

translationally moving and inclining at least one lens element for different object distances in such a way that variation in a position of a primary image point is kept within a range defined by the following condition:

$|\Delta f_b \times \sin(\Theta_{max})|_{max} \leq 0.8$ where $\Delta f_b$ represents a maximum distance traveled by the primary image point during focusing; and $\Theta_{max}$ represents a maximum angle of peripheral rays traveling from a center of an object to a center of an image plane relative to a base ray.

2. A focusing method as claimed in claim 1, wherein the following condition is fulfilled:

$0.7 \leq |\Delta(\beta^\xi/\beta^\eta)|_{max} \leq 1.5$ where $\beta^\xi$ represents a magnification in a ξ direction;

$\beta^\eta$ represents a magnification in an η direction; and $$\Delta\left(\frac{\beta^\xi}{\beta^\eta}\right)$$

represents a maximum variation in a ratio of the magnification in the ξ direction to the magnification in the η direction during focusing, i.e.

$$\left(\frac{\beta^\xi}{\beta^\eta}\right)_{pos(a)} \bigg/ \left(\frac{\beta^\xi}{\beta^\eta}\right)_{pos(b)},$$

where $$\left(\frac{\beta^\xi}{\beta^\eta}\right)_{pos(a)}$$

represents the ratio of the magnification in the ξ direction to the magnification in the η direction at one focusing position pos(a) and $$\left(\frac{\beta^\xi}{\beta^\eta}\right)_{pos(b)}$$

represents the ratio of the magnification in the ξ direction to the magnification in the η direction at another focusing position pos(b).

3. A focusing method as claimed in claim 1, wherein the lens element that is moved and inclined for focusing is disposed at an image plane side end.

4. A focusing method for a decentered optical system including a decentered lens element, comprising:

translationally moving and inclining at least one lens element for different object distances in such a way that a primary image point is kept substantially in a fixed position, wherein the following condition is fulfilled:

$|\Delta f_s/\Delta d_I| \leq 20$ where $\Delta d_I$ represents a variation in the object distance; and $\Delta f_s$ represents an amount of movement, during focusing, of at least one point within an effective area on a surface of the lens element that is moved for focusing.

5. A focusing method as claimed in claim 4, wherein the following condition is fulfilled:

$0.7 \leq |\Delta(\beta^\xi/\beta^\eta)|_{max} \leq 1.5$ where $\beta^\xi$ represents a magnification in a ξ direction;

$\beta^\eta$ represents a magnification in an η direction; and $$\Delta\left(\frac{\beta^\xi}{\beta^\eta}\right)$$

represents a maximum variation in a ratio of the magnification in the ξ direction to the magnification in the η direction during focusing, i.e.

$$\left(\frac{\beta^\xi}{\beta^\eta}\right)_{pos(a)} \bigg/ \left(\frac{\beta^\xi}{\beta^\eta}\right)_{pos(b)},$$

where $$\left(\frac{\beta^\xi}{\beta^\eta}\right)_{pos(a)}$$

represents the ratio of the magnification in the $\xi$ direction to the magnification in the $\eta$ direction at one focusing position pos(a) and $$\left(\frac{\beta^\xi}{\beta^\eta}\right)_{pos(b)}$$

represents the ratio of the magnification in the $\xi$ direction to the magnification in the $\eta$ direction at another focusing position pos(b).

6. A focusing method as claimed in claim 4,
wherein the lens element that is moved and inclined for focusing is disposed at an image plane side end.

7. A decentered optical system, comprising:
a decentered lens element,
wherein at least one lens element is translationally moved and inclined for different object distances in such a way that variation in a position of a primary image point is kept within a range defined by the following condition:

$$|\Delta f_b \times \sin(\Theta_{max})|_{max} \leq 0.8$$

where
$\Delta f_b$ represents a maximum distance traveled by the primary image point during focusing; and
$\Theta_{max}$ represents a maximum angle of peripheral rays traveling from a center of an object to a center of an image plane relative to a base ray.

8. A decentered optical system as claimed in claim 7, wherein the following condition is fulfilled:

$$0.7 \leq |\Delta(\beta^\xi/\beta^\Theta)|_{max} \leq 1.5$$

where
$\beta^\xi$ represents a magnification in a $\xi$ direction;
$\beta^\eta$ represents a magnification in an $\eta$ direction; and $$\Delta\left(\frac{\beta^\xi}{\beta^\eta}\right)$$

represents a maximum variation in a ratio of the magnification in the $\xi$ direction to the magnification in the $\eta$ direction during focusing, i.e.

$$\left(\frac{\beta^\xi}{\beta^\eta}\right)_{pos(a)} \bigg/ \left(\frac{\beta^\xi}{\beta^\eta}\right)_{pos(b)},$$

where $$\left(\frac{\beta^\xi}{\beta^\eta}\right)_{pos(a)}$$

represents the ratio of the magnification in the $\xi$ direction to the magnification in the $\eta$ direction at one focusing position pos(a) and $$\left(\frac{\beta^\xi}{\beta^\eta}\right)_{pos(b)}$$

represents the ratio of the magnification in the $\xi$ direction to the magnification in the $\eta$ direction at another focusing position pos(b).

9. A decentered optical system as claimed in claim 7,
wherein the lens element that is moved and inclined for focusing is disposed at an image plane side end.

10. A decentered optical system, comprising:
a decentered lens element,
wherein at least one lens element is translationally moved and inclined for different object distances in such a way that a primary image point is kept substantially in a fixed position, wherein the following condition is fulfilled:

$$|\Delta f_s/\Delta d_l| \leq 20$$

where
$\Delta d_l$ represents a variation in the object distance; and
$\Delta f_s$ represents an amount of movement, during focusing, of at least one point within an effective area on a surface of the lens element that is moved for focusing.

11. A decentered optical system as claimed in claim 10, wherein the following condition is fulfilled:

$$0.7 \leq |\Delta(\beta^\xi/\beta^{72})|_{max} \leq 1.5$$

where
$\beta^\xi$ represents a magnification in a $\xi$ direction;
$\beta^\eta$ represents a magnification in an $\eta$ direction; and $$\Delta\left(\frac{\beta^\xi}{\beta^\eta}\right)$$

represents a maximum variation in a ratio of the magnification in the $\xi$ direction to the magnification in the $\eta$ direction during focusing, i.e.

$$\left(\frac{\beta^\xi}{\beta^\eta}\right)_{pos(a)} \bigg/ \left(\frac{\beta^\xi}{\beta^\eta}\right)_{pos(b)},$$

where $$\left(\frac{\beta^\xi}{\beta^\eta}\right)_{pos(a)}$$

represents the ratio of the magnification in the $\xi$ direction to the magnification in the $\eta$ direction at one focusing position pos(a) and $$\left(\frac{\beta^\xi}{\beta^\eta}\right)_{pos(b)}$$

represents the ratio of the magnification in the $\xi$ direction to the magnification in the $\eta$ direction at another focusing position pos(b).

12. A decentered optical system as claimed in claim 10, wherein the lens element that is moved and inclined for focusing is disposed at an image plane side end.

* * * * *